United States Patent [19]

Harlan

[11] Patent Number: 6,076,084
[45] Date of Patent: *Jun. 13, 2000

[54] FILE TRANSFER METHOD AND APPARATUS UTILIZING DELIMITERS

[75] Inventor: Jim Harlan, Rockville, Utah

[73] Assignee: Norton-Lambert Corp., Santa Barbara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/766,785

[22] Filed: Apr. 30, 1996

Related U.S. Application Data

[63] Continuation of application No. 08/176,950, Jan. 3, 1994, abandoned.

[51] Int. Cl.[7] .......................................... G06F 17/30
[52] U.S. Cl. ...................................... 707/1; 707/2
[58] Field of Search ................................ 395/614, 613; 364/200, 900; 707/1, 2

[56] References Cited

U.S. PATENT DOCUMENTS

| | | | |
|---|---|---|---|
| 3,311,893 | 3/1967 | Landell | 340/172.5 |
| 3,612,660 | 10/1971 | Miller | 340/172.5 |
| 4,232,375 | 11/1980 | Paugstat et al. | 364/900 |
| 4,412,306 | 10/1983 | Moll | 364/900 |
| 4,641,274 | 2/1987 | Swank | 364/900 |
| 4,701,745 | 10/1987 | Waterworth | 340/347 |
| 4,807,182 | 2/1989 | Queen | 364/900 |
| 4,870,259 | 9/1989 | Boggan et al. | 235/380 |
| 4,891,785 | 1/1990 | Donohoo | 364/900 |
| 4,914,583 | 4/1990 | Weisshaar et al. | 364/200 |
| 4,935,869 | 6/1990 | Yamamoto | 395/600 |
| 4,999,766 | 3/1991 | Peters et al. | 364/200 |
| 5,086,402 | 2/1992 | Sterling, II | 364/514 |
| 5,086,434 | 2/1992 | Abe et al. | 375/7 |
| 5,101,348 | 3/1992 | Arrowood et al. | 395/200 |
| 5,109,485 | 4/1992 | Smith, Jr. | 395/200 |
| 5,155,847 | 10/1992 | Kirouac et al. | 395/600 |
| 5,177,342 | 1/1993 | Adams | 340/825.33 |
| 5,210,535 | 5/1993 | Fujita | 341/51 |
| 5,210,865 | 5/1993 | Davis et al. | 395/575 |
| 5,274,802 | 12/1993 | Altine | 395/600 |

(List continued on next page.)

FOREIGN PATENT DOCUMENTS

| | | |
|---|---|---|
| 0541281 A2 | 5/1993 | European Pat. Off. |
| WO91/02313 | 2/1991 | WIPO . |
| WO93/19420 | 9/1993 | WIPO . |
| WO94/23337 | 10/1994 | WIPO . |

*Primary Examiner*—Anton W. Fetting
*Assistant Examiner*—Cheryl Lewis
*Attorney, Agent, or Firm*—Townsend and Townsend and Crew LLP

[57] ABSTRACT

The present invention facilitates the transmission of a file to a computer where the receiving computer has a file (called the old file) that is related to the file being transmitted (called the new file) but where the sending computer does not know the status or content of the old file. As a preliminary step, one of the computers generates a Delimiter Selection Profile Table (DSPT). The DSPT is generated by first determining the number of times each delimiter in a set of delimiters appears in the file and the distance between the locations of the delimiters in the file. Next using the information in the DSPT one of the delimiters is chosen as the delimiter which will be used and this delimiter is transmitted to the computer which did not generate the DSPT. The receiving computer next generates a Segment Profile (SPT) of the old file and the sending computer generates an SPT the new file. The SPT is generated by calculating a hash code (such as a CRC) for each segment which is defined by the selected delimiter. The hash codes from the old file are transmitted to the sending computer. The sending computer then sends to the receiving computers those segments in the new file that do not have a hash code number which matches one of the hash code numbers from the old file. The sending computer also sends an indication of where segments from the old file should be inserted into the new file. The receiving computer then constructs the new file from the segments received from the appropriate old segments.

7 Claims, 6 Drawing Sheets

U.S. PATENT DOCUMENTS

| | | | |
|---|---|---|---|
| 5,283,646 | 2/1994 | Bruder | 348/415 |
| 5,298,895 | 3/1994 | Van Maren | 341/51 |
| 5,301,268 | 4/1994 | Takeda | 395/700 |
| 5,363,443 | 11/1994 | Petty | 379/418 |
| 5,394,534 | 2/1995 | Kulakowski et al. | 395/425 |
| 5,396,624 | 3/1995 | Campbell, Jr. | 395/600 |
| 5,479,654 | 12/1995 | Squibb | 395/600 |

FIG. 1.

| DELIMITER Z (ONE LETTER DELIMITER) |
|---|
| CHARACTERS IN THE FILE | A G Z E D C R F V Z E R T E G E B Z R G Y U J N E M I Z Q |
| LENGTH BETWEEN DELIMITERS | 2　　　　　6　　　　　　　7　　　　　　　　　9 |

*FIG. 2A.*

| DELIMITER E (ONE LETTER DELIMITER) |
|---|
| CHARACTERS IN THE FILE | A G Z E D C R F V Z E R T E G E B Z R G Y U J N E M I Z Q |
| LENGTH BETWEEN DELIMITERS | 3　　　6　　2　1　　　　　　　　　10 |

*FIG. 2B.*

| DELIMITER G (ONE LETTER DELIMITER) |
|---|
| CHARACTERS IN THE FILE | A G Z E D C R F V Z E R T E G E B Z R G Y U J N E M I Z Q |
| LENGTH BETWEEN DELIMITERS | 1　　　　　　　　　　12　　　　4 |

*FIG. 2C.*

DELIMITER SELECTION PROFILE TABLE (DSPT)

| DELIMITER | NUMBER OF OCCURANCES | LONGEST LENGTH TO PREVIOUS OCCURANCE | OFFSET OF PREVIOUS OCCURANCE |
|---|---|---|---|
| Z | 4 | 9 | 28 |
| E | 5 | 10 | 25 |
| G | 3 | 12 | 20 |
| ALL OTHER DELIMITERS | | | |

*FIG. 2D.*

SEGMENT PROFILE TABLE (SPT)

| SEGMENT | CRC | OFFSET | LENGTH |
|---|---|---|---|
| 0 | | | |
| 1 | | | |
| 2 | | | |
| 3 | | | |
| 4 | | | |
| 5 | | | |
| 6 | | | |
| ETC. | | | |

| NEW FILE | | OLD FILE | | TRANSMITTED FILE | |
|---|---|---|---|---|---|
| SEGMENT # | CRC | SEGMENT # | CRC | SEGMENT # | CRC |
| SEGMENT 1 | 234 | SEGMENT A | 459 | NEW FILE SEGMENT 1 | 234 |
| SEGMENT 2 | 621 | SEGMENT B | 766 | NEW FILE SEGMENT 2 | 621 |
| SEGMENT 3 | 137 | SEGMENT C | 782 | NEW FILE SEGMENT 3 | 137 |
| SEGMENT 4 | 459 | SEGMENT D | 691 | OLD FILE SEGMENT A | 459 |
| SEGMENT 5 | 265 | SEGMENT E | 566 | NEW FILE SEGMENT 5 | 265 |
| SEGMENT 6 | 782 | SEGMENT F | 455 | OLD FILE SEGMENT C | 782 |
| SEGMENT 7 | 691 | SEGMENT G | 934 | OLD FILE SEGMENT D | 691 |
| SEGMENT 8 | 277 | SEGMENT H | 446 | NEW FILE SEGMENT 8 | 277 |
| SEGMENT 9 | 455 | SEGMENT I | 622 | OLD FILE SEGMENT F | 455 |
| SEGMENT 10 | 322 | SEGMENT J | 199 | NEW FILE SEGMENT 10 | 322 |
| SEGMENT 11 | 677 | | | NEW FILE SEGMENT 11 | 677 |
| SEGMENT 12 | 296 | | | NEW FILE SEGMENT 12 | 296 |

# FILE TRANSFER METHOD AND APPARATUS UTILIZING DELIMITERS

This is a Continuation of application Ser. No. 08/176,950, filed Jan. 3, 1994 now abandoned.

FIELD OF THE INVENTION

The present invention relates to electronic computers and more particularly to the transfer of files between computers.

BACKGROUND OF THE INVENTION

There are a wide variety of commercially available computer programs which facilitate transferring files between computers utilizing modems and telephone lines. Among the commercially available program which provide such functions are: "crosstalk" marketed by DCA Corp of Atlanta, Ga.; "QModem" marketed by Forgin Inc. of Cedar Falls Iowa; and, "Close-Up" marketed by Norton Lambert Corp of Santa Barbara, Calif.

The physical characteristics of normal telephone lines limit the transmission speed which can be used to transmit data over such lines. In order to shorten the time required to transmit data, various types of data compression and error correcting protocols are in widespread use.

Where a system transmitting a data file from a first computer to a second computer is merely updating a file which has been previously transmitted to the second computer, the transmission time can be shorted by merely transmitting information which covers the "differences" between the present file and the previously transmitted file. This technique of only transmitting the "delta" between two files is only applicable in situations where the sending system knows the state of the file at the receiving station.

The present invention provides a technique for transmitting files between computers where the computer receiving the information has a file related to the file being transmitted, but where the sending computer does not know the state of the file at the receiving computer.

SUMMARY OF THE INVENTION

The present invention facilitates the transmission of a file to a computer where the receiving computer has a file (called the old file) that is related to the file being transmitted (called the new file) but where the sending computer does not know the status or content of the old file. With the present invention as a preliminary step, one of the computers generates a Delimiter Selection Profile Table (DSPT). Either the receiving computer generates a DSPT of the old file or the sending computer generates a DSPT of the new file. The DSPT is generated by first determining the number of times each delimiter in a set of delimiters appears in the file and the distance between the locations of the delimiters in the file. Next using the information in the DSPT one of the delimiters is chosen as the delimiter which will be used and this delimiter is transmitted to the computer which did not generate the DSPT. The receiving computer next generates a Segment Profile (SPT) of the old file and the sending computer generates an SPT the new file. The SPT is generated by calculating a hash code (such as a CRC) for each segment which is defined by the selected delimiter. The hash codes from the old file are transmitted to the sending computer. The sending computer then sends to the receiving computers those segments in the new file that do not have a hash code number which matches one of the hash code numbers from the old file. The sending computer also sends an indication of where segments from the old file should be inserted into the new file. The receiving computer then constructs the new file from the segments received from the appropriate old segments.

DETAILED DESCRIPTION OF A PREFERRED EMBODIMENT

Figure 1:
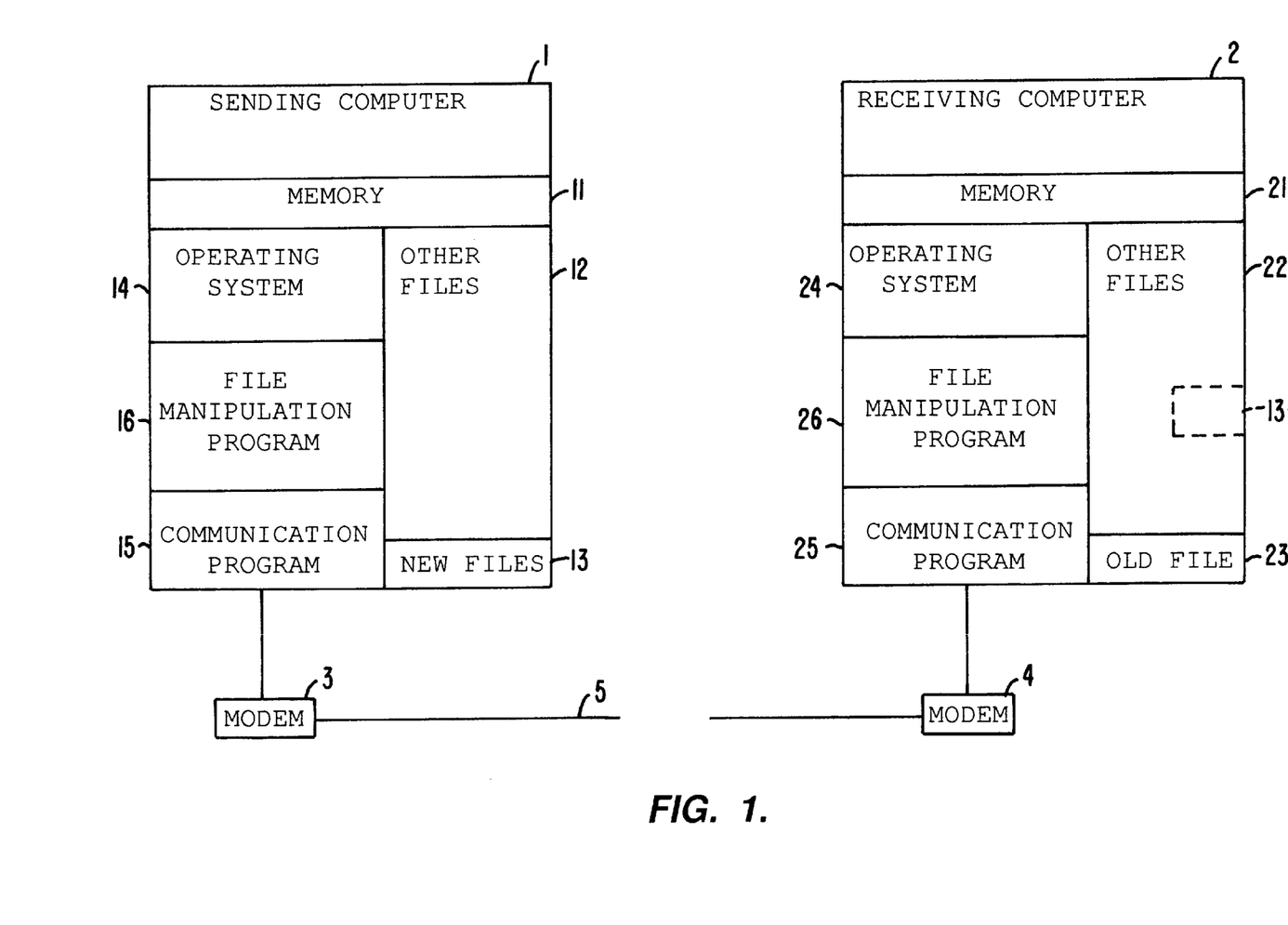
FIG. 1 is an overall block diagram of the computer systems.

An overall diagram of interconnected computers that can be used to practice the invention are shown in FIG. 1. A sending computer 1 is connected to a receiving computer 2 via modems 3 and 4 and a telephone line 5.

Computer 1 has an internal memory 11 which has stored therein a number of programs and files. It is noted that while the programs and file are shown as being in the memory of computer 1, a substantial part of these program could alternatively be on conventional storage devices such as on magnetic disks. How the programs and files are stored is not relevant to the present invention and it can be in any conventional manner.

The computer memory 11 includes an operating system 14, a communication program 15, a file manipulation program 16, a new file 13 and other files 12. The operating system 14 could be the DOS operating system that is marketed by Microsoft Corporation and the communications program 15 can be a conventional communication program. The new file 13 is the file which computer 1 would like to transmit to computer 2. The file manipulation program 16 is the program which implements the main parts of the present invention.

The computer 2 is substantially identical to the computer 1 and it includes memory 21, operating system 24, file manipulation program 26, and communication program 25. These components are similar to the corresponding components in computer 1. The old file 23 is a file that is related to new file 13. That is, some parts of old file 23 are similar to parts of new file 13. The block 13C shown in dotted lines represents the copy of file 13 which is transmitted to computer 2 using the present invention. The preferred embodiment of the invention described herein transfers a new file 13 from computer 1 to computer 2 using the following major steps.

a) One of the files on computer 2 is designated as old file 23.

b) The file on computer 1 is analyzed and a Delimiter Selection Profile Table (DSPT) is generated.

c) A delimiter is selected based on the information in the DSPT.

d) Both the new and the old file are divided into segments based on the selected delimiter and the segments are analyzed and a Segment Profile Table (SPT) is generated for both the old and the new files. A hash number for each segment is generated.

e) Those segments in the new file which do not have a hash number corresponding to the hash number of a segment in the old file are sent to the receiving computer, and f) The receiving computer combines the parts of the new file that were transmitted with segments from the old file which have hash numbers corresponding to segments in the new file to construct a replica or copy of the new file at the receiving computer.

Each of the above major steps will now be explained in detail as will their purpose and how they are carried out. FIG. 2A to 2D are diagrams that facilitate an explanation of what constitutes a delimiter. It is noted that these are simplified examples and they do not show the delimiter used in the preferred embodiment of the invention shown and described herein. The actual delimiter used in the preferred embodiment of the invention will be explained later.

Figure 2A:
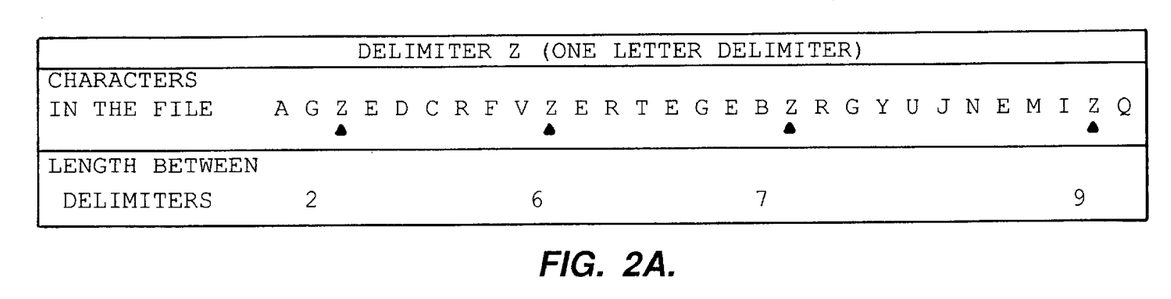
FIG. 2A to 2C are tables which show a simple example of how a delimiter divides a file into segments.
Figure 2B:
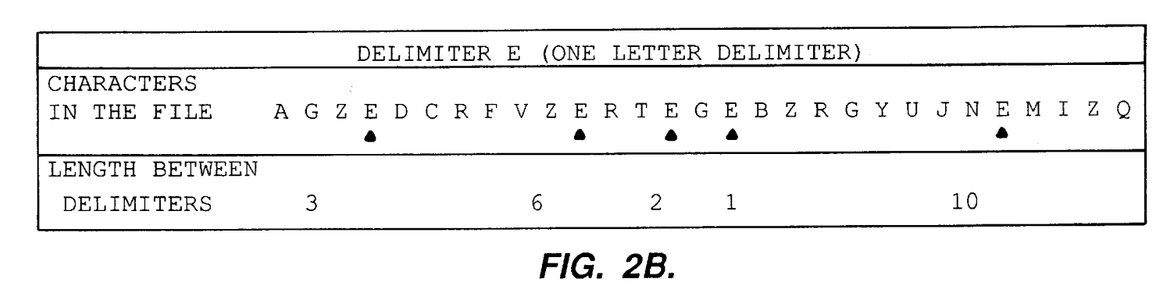
Figure 2C:
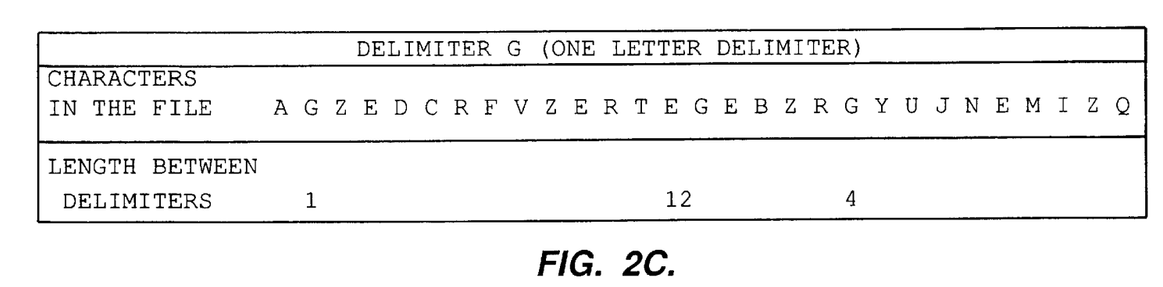

Each of the FIGS. 2A to 2C show a file which has the characters:

A G Z E D C R F V Z E R T E G E B Z R G Y U J N E X I Z Q

FIG. 2A shows dividing the file with the delimiter "Z". As shown in FIG. 2A the delimiter Z divides the file into five segments. The first segment is "A G" the second segment is "E D C E F V" etc. The length of the segments is 2, 6, 7, 9, and 1.

FIG. 2B shows dividing the file with the delimiter "E". In this case the file is divided into 6 segments. FIG. 2C shows dividing the file with the delimiter "G". As can be seen by FIGS. 2A, 2B and 2C the number of segments in a file and the length of the segments depends on which delimiter is selected to divide the file.

Figure 2D:
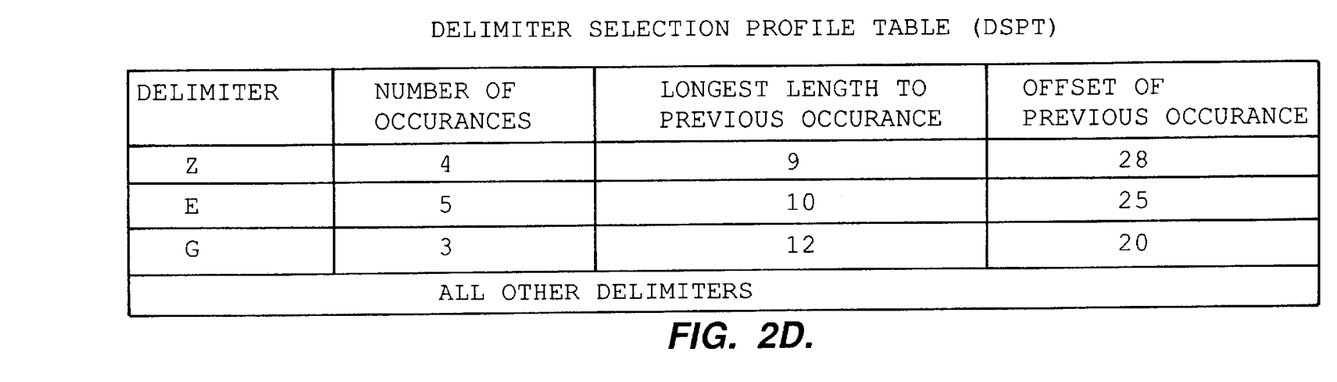
FIG. 2D is a simple example of a Delimiter Selection Profile Table.

FIG. 2D shows a Delimiter Selection Profile Table (DSPT). The results of using the delimiters "Z", "E", and "G" as shown in FIG. 2A, 2B and 2C has been entered into the DSPT in FIG. 2D. The DSPT shows the number of occurrences of each delimiter in the file, the longest length segment for the delimiter and offset to the previous occurrence of the delimiter. The offset is what is used to calculate the length of the segment.

It is noted that the typical computer file consists of eight bit bytes. Thus if any one of the possible combinations of the eight bits in a byte is taken as a delimiter there are two hundred and fifty six possible one byte delimiters. It is noted that the example in FIG. 2A to 2D shows alphabetic characters as delimiters, and there are only twenty six of such characters; however, the eight bits in each byte of a computer file can also have other configurations than the configurations that give the twenty six alphanumeric characters. In fact as previously explained there are two hundred and fifty six possible configurations of the eight bits in a single byte.

A delimiter can also be a particular two byte combination. In fact it could also be a particular three byte combination. If two byte combinations are used as delimiters there are 65,536 possible delimiters. If three byte combinations are used as delimiters there are 16,777,216 possible combinations of the twenty four bits in the three bytes. In the preferred embodiment of the invention described herein, a sixteen bit, two byte delimiter is used.

Figure 3:
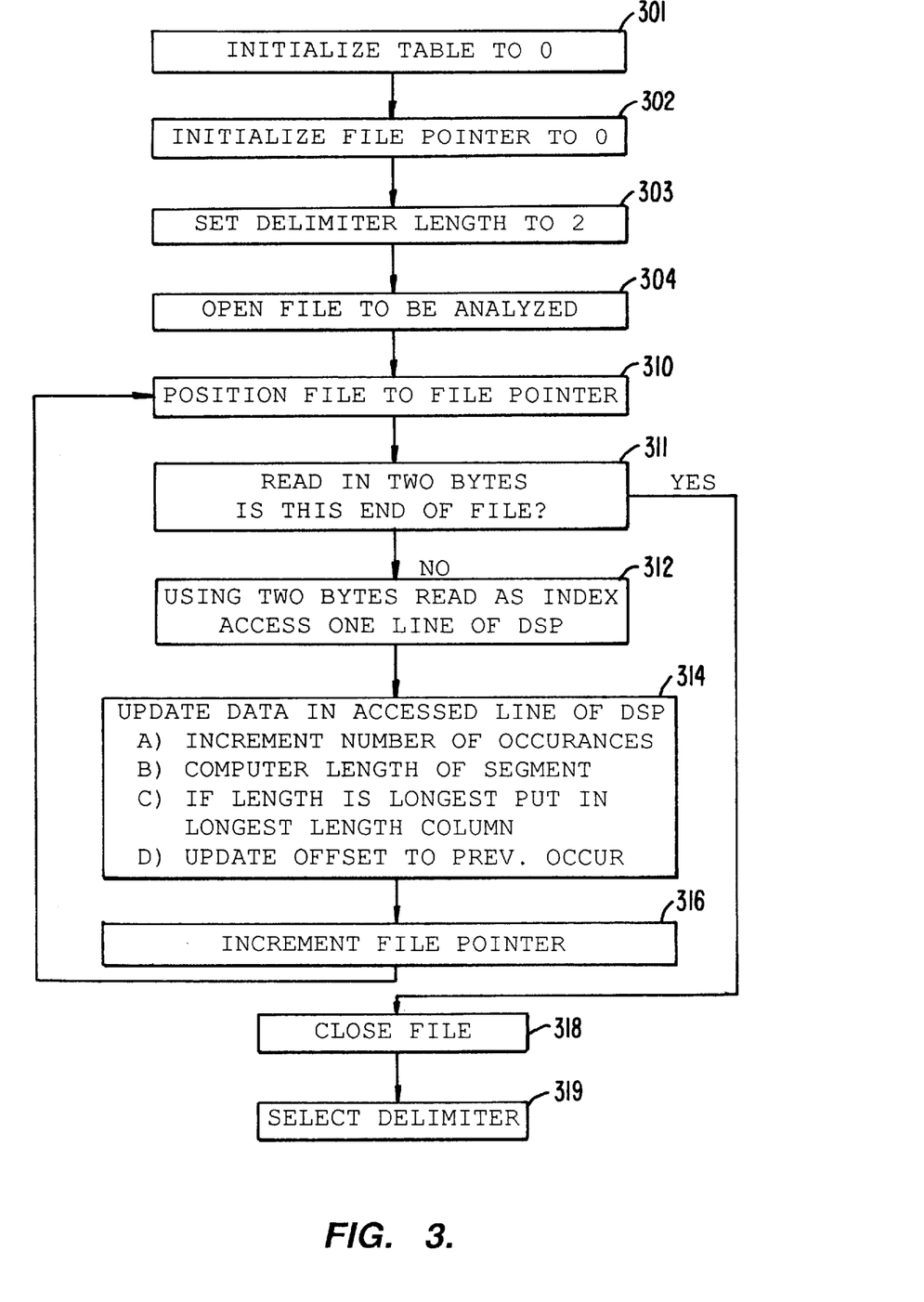
FIG. 3 is a flow diagram showing how the Delimiter Selection Profile Table is generated.
Figure 4:
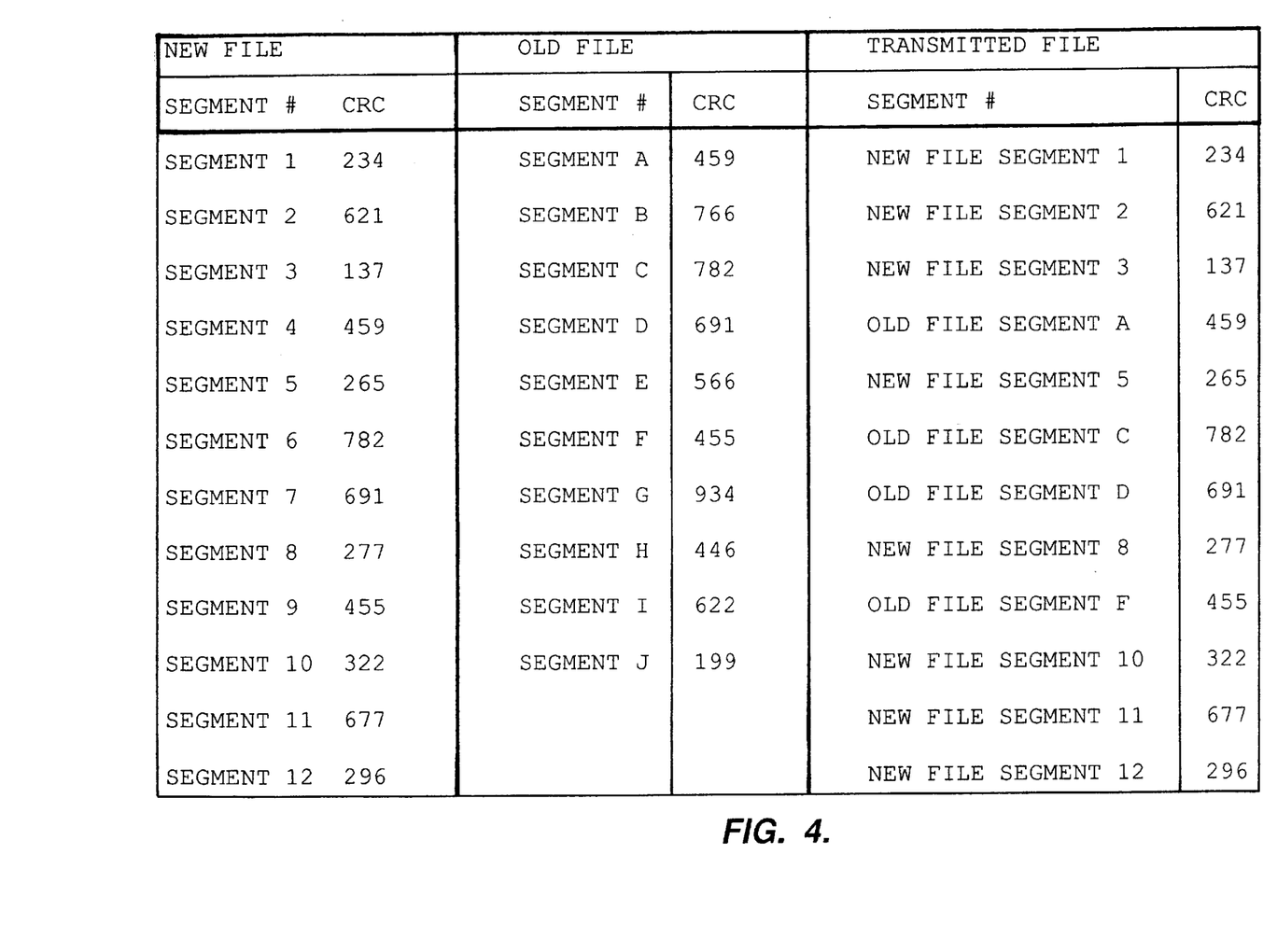
FIG. 4 is a table showing how segments of a file fit together.

FIG. 3 is a block diagram of the subroutine that is used to calculate the Delimiter Selection Profile Table (DSPT). At the beginning of the routine (block 301), the entries in the DSPT are initialized to "0". Next the file pointer (i.e. the pointer to the location in the file being analyzed) is set to 0 (block 302). In the preferred embodiment used herein the delimiter length is "two". After the parameters are initialized the file being analyzed is opened (block 304). The file pointer is next set to a value which points to the beginning of the file (block 310) and a number of bytes equal to the length of the delimiter is read.

This is the beginning of a loop and if the end of the file is detected, the process goes to a termination routine (block 318). If this is not the end of the file, the two bytes which were read are used as an index to access one line of the DSPT (block 312). Note the outline of the DSPT is shown in FIG. 2D. The accessed line in the DSPT is then updated by:

a) Incrementing the number of occurrences, b) The length of the segment is computed by using the "Offset of the previous occupance" from the last column of the DSPT. If the computed length is longer than the previous "longest length", the computed length is put in column 2 of the DSPT.

c) The offset in the previous occurrence column of the DSPT is updated by placing the present value of the file pointer in this field.

Once the line in the DSPT is updated, the file pointer is incremented (block 316) and the loop is repeated by returning to block 310 which reposition the file pointer. Two bytes are them read in. Note, the file pointer had only been incremented by one, hence one of the bytes which is read in is the same byte as was previously read in.

When the end of the file is reached the process goes to block 318 which closes the file and to block 319 where the data in the DSPT is used to select a delimiter. A variety of algorithms could be used to select a delimiter. However, in the preferred embodiment described herein, the delimiter is selected by first going through the DSPT and choosing the first delimiter where the number of occurrences is greater than 50 and the average length between delimiters is greater than 1,000 and less than 30,000. If on the first pass through the DSPT no delimiter is found which meets the selection criteria, the selection criteria is eased. For example on the second pass one would try to find a delimiter where the number of occurrences is greater than 40 and the average length between delimiters is greater than 900 and less than 25,000. The various selection criteria can at first be chosen relatively arbitrarily. While delimiters chosen arbitrarily will in fact work, experience will show the particular criteria that works most satisfactorily with each type of file.

It is noted that the delimiter selection process can either take place on the new file which is located on the sending computer 1 or it can take place on the old file which is on receiving computer 2. For the preferred embodiment of the invention shown herein, the delimiter selection process takes place by analyzing the new file on the sending computer 1.

Once the delimiter has been selected, it is transferred to the computer which did not perform the selection process. Since in this embodiment the selection process is performed by the sending computer, the selected delimiter is then sent to the receiving computer.

Figure 5:
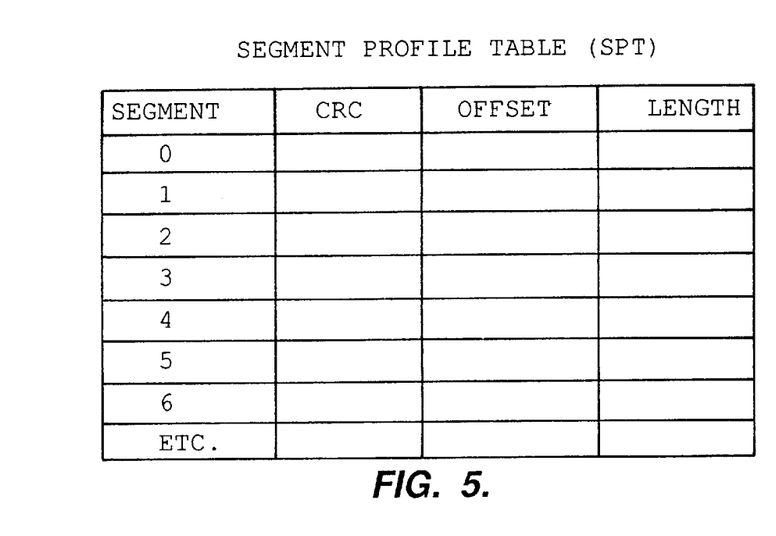
FIG. 5 is an example of a Segment Profile Table.
Figure 6:
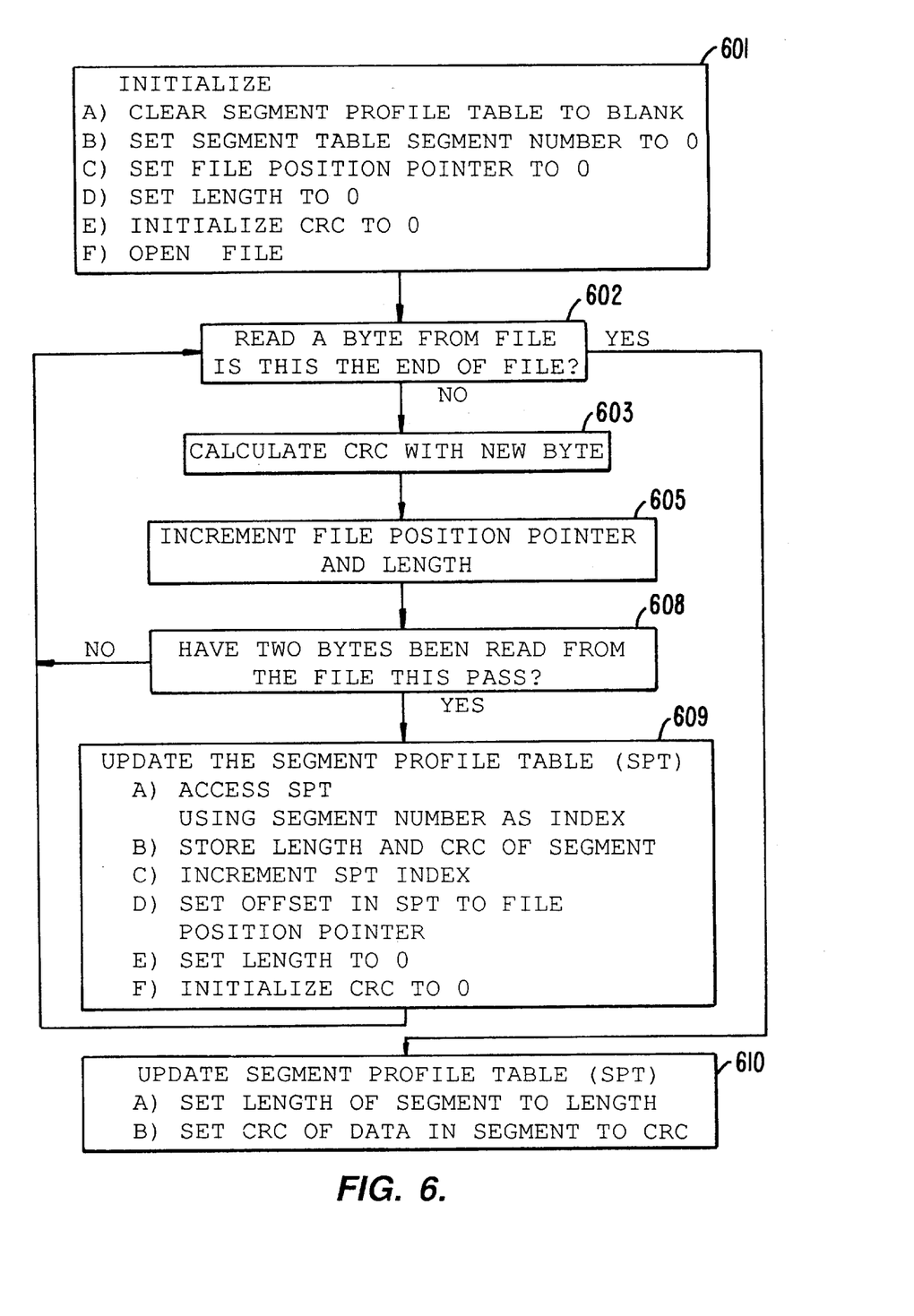
FIG. 6 is a flow diagram showing how a Segment Profile Table is generated.

The selected delimiter and algorithm shown in FIG. 6 are used by the sending computer 1 to analyze the new file and by receiving computer 2 to analyze the old file. Prior to explaining the process shown in FIG. 6, the Segment Profile table (SPT) shown in FIG. 5 will be explained.

A SPT has one line for each segment in a file. A segment is a series of bytes that is terminated by the selected delimiter or by an end of file marker.

The segment profile table gives three numbers for each segment. The first number is an offset which tells where the segment begins and the second number is the length of the segment. The third number in the SPT relative to each segment is a hash number or CRC for the segment. It is noted that the hash number used herein is the CRC (cyclical redundancy check number) however, it can be anyone of the well known types of number hash numbers which generate a unique identifying number from a series of bits or bytes. It is also noted that while a CRC or other hash number is described herein as defining a unique segment, mathematically duplication or errors are possible. The likely hood of such errors is so remote (less likely than a failure in the typical computer hardware) that they can for the purposes of the present invention be considered to be unique. It is also noted that to decrease the likelihood of error and to facilitate computation, two concatenated CRC number can be used. The particular technique used to generate hash numbers (e.g. CRC numbers) forms no part of the present invention and can be conventional. The algorithm in FIG. 6 is used to calculate the entries in the SPT for each of the files. The sending computer calculates these values for the new file and the receiving computer calculates these numbers for the old file.

Block 601 shows that the initialization operations include the following:

a) Clear the Segment Profile Table (SPT), that is, set all entries in the SPT to blanks.

b) Set the segment number in the first line of the SPT to "0".

c) Set the file position pointer to "0".

d) Set the length entry in the first line of the SPT to "0".

e) Set the CRC entry in the first line of the SPT to "0".

f) Open the file being analyzed.

The function of blocks 602, 603, 605 and 608 is the read two bytes from the file, to calculate the CRC of these bytes, and to determine if the end of file has been reached. Two passes through this loop are required to calculate the CRC of a two byte delimiter. When the output of block 608 is "yes", the Segment Profile Table (SPT) is updated as shown by block 609. The updating operations include:

a) Accessing a line in the SPT using the segment number as an index.

b) Store the length of the segment and the CRC of the segment in the accessed line.

c) Increment the SPT index, that is, move to the next line of the SPT and store the SPT index in the first column of the SPT.

d) Set the offset in the indexed line of the SPT to the value of the file position pointer.

e) Set the length in the indexed line of the SPT to "0".

f) Set the CRC in the indeed line of the SPT to "0".

At the end of the operations shown in block 609, the process repeats, that is, the process returns to block 602. When block 602 finally detects the end of file condition, the operations go to block 610 which updates the last line in the SPT.

It is noted that as described herein, the delimiter is described as being two bytes long. Alternatively delimiters of other lengths could be used. In particular, in specialized applications, delimiters lengths specific to the application could be used.

It is noted that as described above, computer 2 has a single "old file" 23. In most personal computers or work stations, a large number of files are stored. As a first step in the transfer process, one of the files on computer 2 is selected as the "old file" 23. This is done by transmitting to computer 2 from computer 1, the file name and file type of the file that is being transmitted. A file on computer 2 is selected to be "old file" 23 according to the following priorities.

1) Select a file with the same file name and the same file type. If no such file, 2) Select a file with the same file name. If no such file, 3) Select a file with the same file type and where the names differ by no more than two characters. If no such file, 3) Select a file with the same file type. If no such file, 4) Select any file on an arbitrary basis.

While the invention has been shown and described with respect to particular embodiments thereof, it will be understood by those skilled in the art that a variety of changes in form and detail may be made without departing from the spirit and scope of the invention. The invention is limited solely by the appended claims.

While in the preferred embodiment described above, a file of the type used in DOS based computers was transferred from computer 1 to computer 2, it should be understood that in alternative embodiments, the invention could be used to transfer other types of "files" between computers. For example the invention could be used to transfer a particular string of bytes from one computer to a second computer. Thus, it should be understood that the present invention can be used to transfer any string of bytes (herein termed a "file") from one computer to a second computer.

It is also noted that the segments used in the above described preferred embodiment are 128 bytes long. Longer or shorter segments could be selected depending upon the particular nature of the files being transmitted. Furthermore the segment length could be made dependent on various factors such as whether there is a file in computer 2 with the same file name and file type as the file in the sending computer or the file type of the file begin transferred.

It is noted that as described the file is divided into fixed length segments, alternative techniques for dividing the file into segments could also be used. It is also noted that as described herein the files are first divided into segments, the SPTs are generated and then the segments where there is no matching segment in the old file are transferred. In alternative embodiments, while the SPTs are being generated, some parts of the file could be transferred in order to save some additional time.

We claim:

1. A method of transferring a first file from a first computer to a second computer, where a second file is stored on said second computer comprising the steps of:

a) analyzing one of said files to generate a Delimiter Selection Profile Table (DSPT), b) selecting a delimiter based on said DSPT, c) analyzing both the first and the second files to generate a first Segment Profile Table (first SPT) and a second Segment Profile Table (second SPT) for segments defined by the selected delimiter for both the first and the second files, d) sending to the first computer the second SPT, e) sending from the first computer to the second computer a first set of segments of said first file which do not have a matching entry of the first and second SPT, and f) combining at the second computer the segments in said first set of segments, with a second set of segments from the second file which have corresponding entries in said first and second SPT, whereby said first file is quickly transferred to said second computer.

2. The method recited in claim 1 wherein said files consist of a series of bytes and where said delimiter is two bytes long.

3. The method recited in claim 1 wherein said second file is analyzed to generate said DSPT.

4. A system for transferring a first file a first computer to a second computer, where a second file is stored on said second computer comprising:
   a) means for analyzing one of said files to generate a Delimiter Selection Profile Table (DSPT),
   b) means for selecting a delimiter based on said DSPT,
   c) means for analyzing both the first and the second files to generate a first Segment Profile Table (first SPT) and a second Segment Profile Table (second SPT) for segments defined by the selected delimiter for both the first and the second files,
   d) means for sending to the first computer the second SPT,
   e) means for sending from the first computer to the second computer a first set of segments of said first file which do not have a matching entry of the first and second SPT, and
   f) means for combining at the second computer the segments in said first set of segments, with a second set of segments from the second file which have corresponding entries in said and second SPT.
   whereby said first file is quickly transferred to said second computer.

5. A method of transferring a first file from a first computer to a second computer, where a second file is stored on said second computer comprising the steps of:
   a) analyzing one of said files to generate a Delimiter Selection Profile Table (DSPT),
   b) selecting a delimiter based on said DSPT,
   c) analyzing both the first and the second files to generate a first Segment Profile Table (first SPT) and a second Segment Profile Table (second SPT) for segments defined by the selected delimiter for both the first and the second files,
   d) sending to the first computer the second SPT,
   e) sending from the first computer to the second computer a first set of segments of said first file which do not have a matching entry of the first and second SPT, and
   f) combining at the second computer the segments in said first set of segments, with a second set of segments from the second file which have corresponding entries in said first and second SPT,
   whereby said first file is quickly transferred to said second computer; and
   wherein said files consist of a series of bytes and where said delimiter is two bytes long.

6. The method recited in claim 5 wherein said second file is analyzed to generate said DSPT.

7. A system for transferring a first file on a first computer to a second computer,
   where a second file is stored on said second computer comprising
   a) means for analyzing one of said files to generate a Delimiter Selection Profile Table (DSPT),
   b) means for selecting a delimiter of at least two bytes based on said DSPT,
   c) means for analyzing both the first and the second files to generate a first Segment Profile Table (first SPT) and a second Segment Profile Table (second SPT) for segments defined by the selected delimiter for both the first and the second files,
   d) means for sending to the first computer the second SPT,
   e) means for sending from the first computer to the second computer a first set of segments of said first file which do not have a matching entry of the first and second SPT, and
   f) means for combining at the second computer the segments in said first set of segments, with a second set of segments from the second file which have corresponding entries in said first and second SPT,
   whereby said first file is quickly transferred to said second computer.

* * * * *